United States Patent
Schumacher et al.

(10) Patent No.: US 6,269,446 B1
(45) Date of Patent: Jul. 31, 2001

(54) AUTHENTICATING IMAGES FROM DIGITAL CAMERAS

(75) Inventors: Thomas Schumacher, Cupertino; Timothy L. Kohler, San Jose, both of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/105,046

(22) Filed: Jun. 26, 1998

(51) Int. Cl.[7] .................. H04L 9/32; H04L 9/30
(52) U.S. Cl. .................. 713/176; 713/179; 713/181; 380/30
(58) Field of Search .................. 713/160, 161, 713/162, 176, 177, 178, 179, 181; 380/30, 179, 234, 279

(56) References Cited

U.S. PATENT DOCUMENTS

| | | | |
|---|---|---|---|
| 5,005,200 | 4/1991 | Fischer | 380/30 |
| 5,027,401 | 6/1991 | Soltesz | 380/54 |
| 5,499,294 | 3/1996 | Friedman | 380/10 |
| 5,579,393 | * 11/1996 | Conner et al. | 380/25 |
| 5,629,981 | 5/1997 | Nerlikar | 380/25 |
| 5,659,617 | 8/1997 | Fischer | 380/25 |
| 5,712,914 | 1/1998 | Aucsmith et al. | 380/30 |
| 5,787,172 | * 7/1998 | Arnold | 380/21 |
| 5,799,083 | 8/1998 | Brothers et al. | 380/20 |
| 6,105,134 | * 8/2000 | Pinder et al. | 713/170 |
| 6,111,953 | * 8/2000 | Walker et al. | 380/51 |

OTHER PUBLICATIONS

"Introduction to Message Privacy", <http:/www/pgp.com/privacy/intro–priv.cgi#mpriv–digsigs>, 6 pages, (visited Dec. 17, 1997).

* cited by examiner

Primary Examiner—Tod Swann
Assistant Examiner—Justin T. Darrow
(74) Attorney, Agent, or Firm—Fitzpatrick, Cella, Harper & Scinto

(57) ABSTRACT

Authentication of image from digital cameras with GPS-derived time and location data is disclosed. With the widespread availability of today's desktop tools and imaging devices, unethical manipulation of digital image data is common, such that digital images are not ordinarily reliable and can be subject to trickery and forgery. In the past, imagery such as photographs and digital images were reliable enough to serve as documentary evidence in most cases, since a skilled craftsman was needed to modify the images and commit fraud. However, skilled craftsmen are no longer needed, and digital images can be modified by even a casual user. Moreover, time data and location data are not ordinarily included in digital images. According to the invention, a digital camera system documents the time, date and location where a digital image was taken, using GPS-derived data from a secure connection. The validity and authenticity of the digital image, as well as the time data and location data, is then protected with a public key signature system that provides a digital signature by which the image and time and location information can be authenticated.

59 Claims, 4 Drawing Sheets

AUTHENTICATING IMAGES FROM DIGITAL CAMERAS

BACKGROUND OF THE INVENTION

1. Field of the Invention

The present invention relates to public key/private key authentication of images from digital cameras, and more particularly relates to public key/private key authentication of images from digital cameras with global positioning system (GPS) data.

2. Description of the Related Art

Digital cameras have become popular devices for producing high quality digital images of photographic scenes. In general, digital cameras create a digital image by exposure of a CCD sensor array to a photographic scene, followed by conversion of the CCD data to digital image data that is stored in the camera. Thereafter, the digital image data stored in the camera may be transferred to a personal computer or other more permanent storage for printout, viewing, transmission and the like.

One problem with digital image data, however, is the ease with which such data can be manipulated or changed, thereby creating a false representation of the original photographic scene. Such problems are particularly prevalent in certain fields such as forensics and legal or law enforcement fields, where it is essential to prove the authenticity of images. Because of the ease with which digital images may be altered so as to distort the appearance of the original photographic scene, proof of authenticity can often be difficult and sometimes impossible.

Conventional approaches to proving authenticity of digital images have involved the use of public key/private key digital signatures. One such conventional approach is described in U.S. Pat. No. 5,499,294 to Friedman. Friedman's approach involves the use of an embedded private key in a digital camera, with the private key being used to create a digital signature based on a message digest of the image data. Thereafter, a user wishing to authenticate-the image data obtains a public key that corresponds to the embedded private key. As is known in conventional public key/private key authentication, the public key and the private key correspond to each other such that only one public key can decrypt data encrypted with the private key, and vice-versa. Accordingly, through use of the public key, a user of Friedman's system is able to authenticate that image data has not been modified since when it was originally obtained by the digital camera.

One drawback of the Friedman system is its inability also to provide authentication of the photographic event, such as authentication of the time, date and position of the photographic scene involved, at least without visually distorting the digital image of the photographic scene. Specifically, Friedmin's system contemplates an arrangement in which GPS-derived position information is inserted as image data in a frame surrounding the photographic scene. However, such a frame detracts from the visual appearance of the image, making the image less pleasing to the viewer. Moreover, use of such data to authenticate the event is entirely manual, since the data is visual and must be inspected by a human operation. In addition, since the GPS-derived data is actually stored as image data, it is difficult to use the GPS-derived data for other purposes, such as sorting or cataloging.

SUMMARY OF INVENTION

It is therefore an object of the invention to authenticate events and images from digital cameras with GPS-derived data, by deriving a digital signature based on both coded GPS data and the image data, and by storing the digital signature in a header for a file with the image data.

Thus, in one aspect, the invention authenticates image data from digital cameras that have captured GPS-derived data as well as image data. A message digest is created for the image data, with the message digest being derived from the image data itself together with GPS-derived data such as time stamp data, location data. It is also preferable to include camera information data, such as serial number of the camera, size information, exposure information, and the like. The message digest is encrypted with a private key secure with the digital camera, and an image file is created together with a header that includes the private-key-encrypted message digest together with the unencrypted data that went into forming the message digest. For convenience, other information may also be stored in the header, such as a public key used to decrypt the encrypted message digest and which corresponds to the private key, and such as an identifier for the hashing function used to create the message digest.

The encrypted message digest forms a digital signature which verifies the authenticity of the image data, and which also verifies the authenticity of the event based on the GPS-derived data in the header. Moreover, because the GPS-derived data is stored in a header and not as part of the image data, the GPS-derived data can be used for other purposes such as sorting and cataloging, and the visual appearance of the image data is not distorted by the presence of unwanted GPS data.

In other aspects, the invention is verification of the authenticity of digital camera images having GPS-derived data. According to this aspect, to verify the authenticity of digital camera images, a public key is obtained, for example, from a trusted party. The public key is used to decrypt the private-key-encrypted message digest, so as to obtain a message digest for the picture. A trial message digest is calculated, using the same hashing function as was used by the digital camera to form the original message digest. The trial message digest is compared to the decrypted message digest for equality. If the two message digests agree, then the image data and the GPS-derived data are authenticated; conversely, if the two message digests do not agree, the image data and the GPS data cannot be trusted.

A additional feature of the invention involves the provision of a secure connection between a GPS receiver and a digital camera. Specifically, as can be appreciated from the foregoing explanation, one potentially weak link in the authentication/verification sequence is the connection between GPS information and the digital camera. If such a link is not secure, then it is possible for GPS data to be simulated to the digital camera, thereby resulting in forged images from the digital camera. To combat this possibility, a secure connection is provided between the GPS receiver and the digital camera, with the secured connection taking the form of either a public is key/private key encryption arrangement between the GPS receiver and the digital camera, or alternatively a GPS receiver that is built into the camera or resides on the same integrated circuit as the camera.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
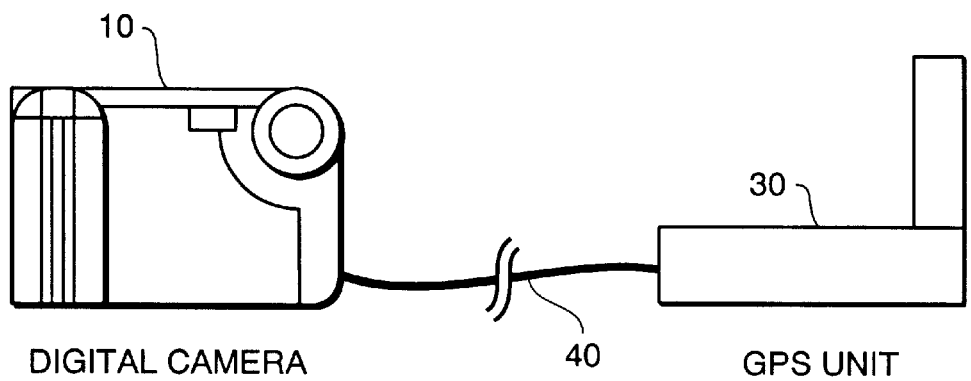
FIG. 1 is a perspective view of the outward appearance of an embodiment of the invention.

FIG. 1 is a view of the outward appearance of an embodiment of the present invention, in which a digital signature is obtained for image data from a digital camera. Specifically, shown in FIG. 1 is a digital camera 10 connected to a GPS unit 30 over a secure connection 40. Digital camera 10 obtains a digital image for a photographic scene by exposing a CCD sensor array to the photographic scene and converting the CCD data into digital data. GPS unit 30 obtains GPS-derived data such as time and location data through conventional triangulation techniques using the GPS grid of orbital satellites. Although the presently-described embodiment illustrates use of GPS unit 30 so as to derive time and location data, the practice of the invention is not limited to a GPS receiver for providing such information, and any now-known or future-developed system for providing time and location data over a secure link to digital camera 10 may also be used in the practice of the invention.

Secure link 40 provides a secure connection between digital camera 10 and GPS unit 30, thereby preventing a forger from masquerading himself as GPS unit 30 and providing false time and location information to digital camera 10, specifically, secure link 40 may comprise a public key/private key authentication arrangement between GPS unit 30 and digital camera 10, such that the time and location information from GPS unit 30 includes a digital signature encrypted by a private key known only to GPS unit 30. Digital camera 10, upon receipt of time and location information from GPS unit 30, uses a public key from a trusted source so as to validate the authenticity of the digital signature, before permitting use of the time and location information from the secure link.

Alternatively, although FIG. 1 depicts digital camera 10 as a unit separate from GPS unit 30, it is possible to provide a secure link by incorporating a GPS receiver into digital camera 10 itself, or more preferably on the same chip as the digital camera.

Figure 2:
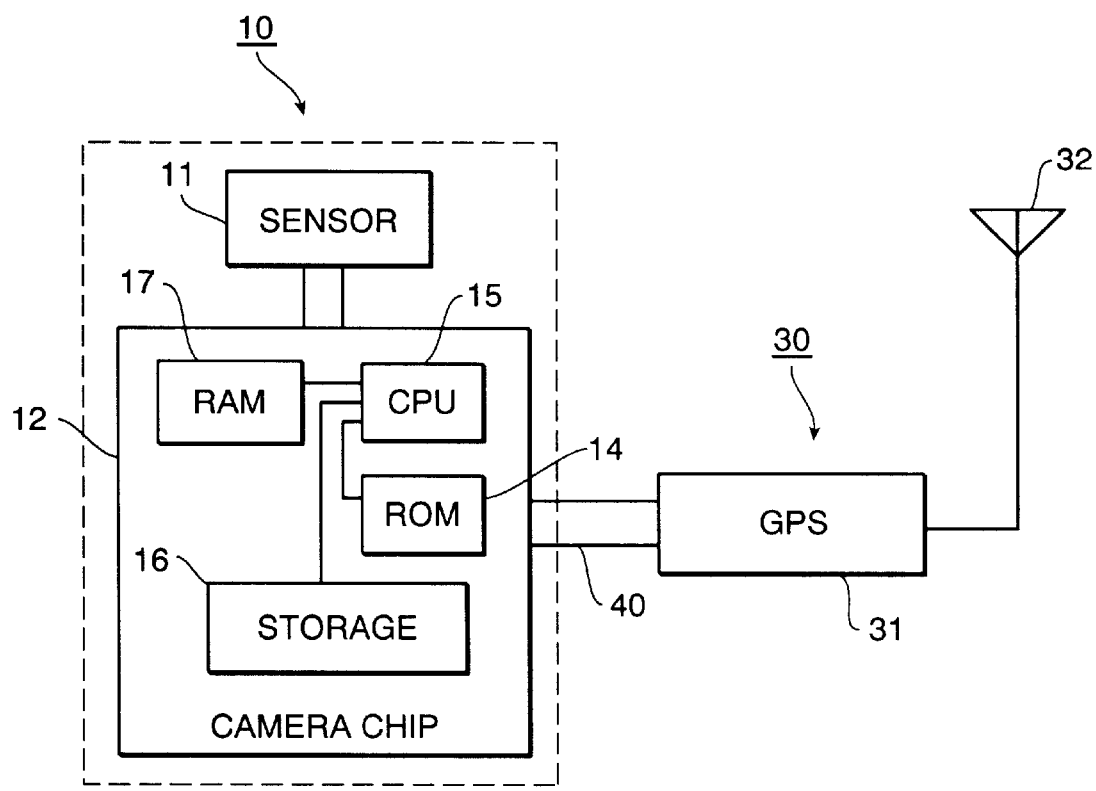
FIG. 2 is a block diagram of the FIG. 1 embodiment.

FIG. 2 depicts a block diagram of the FIG. 1 embodiment. As shown in FIG. 2, digital camera 10 includes a sensor array 11 of CCD sensors which are exposed to a photographic scene through an unshown lens and exposure control mechanism. Digital camera 10 further includes a camera chip 12 on which are arranged a ROM 14 for storing program instruction sequences that control the digital camera, together with a CPU 15 which executes the program instruction sequences so as to cause the digital camera to expose sensor array 11 to a photographic scene and derive digital image data corresponding to the photographic scene. The digital image data is stored in memory storage section 16. The memory storage section 16 may be removable, so as to facilitate transfer of the digital image data to other devices such as a PC, and/or camera 10 may be provided with an unshown interface so as to facilitate transfer of digital image data even if memory storage 16 is not removable. A RAM 17 is further provided so as to provide camera 10 with short term and scratch pad random access memory, particularly for use in deriving a digital signature for the digital image.

GPS 30 includes a GPS receiver 31 and a GPS antenna 32, and is connected to camera 10 over secure connection 40.

Figure 3:
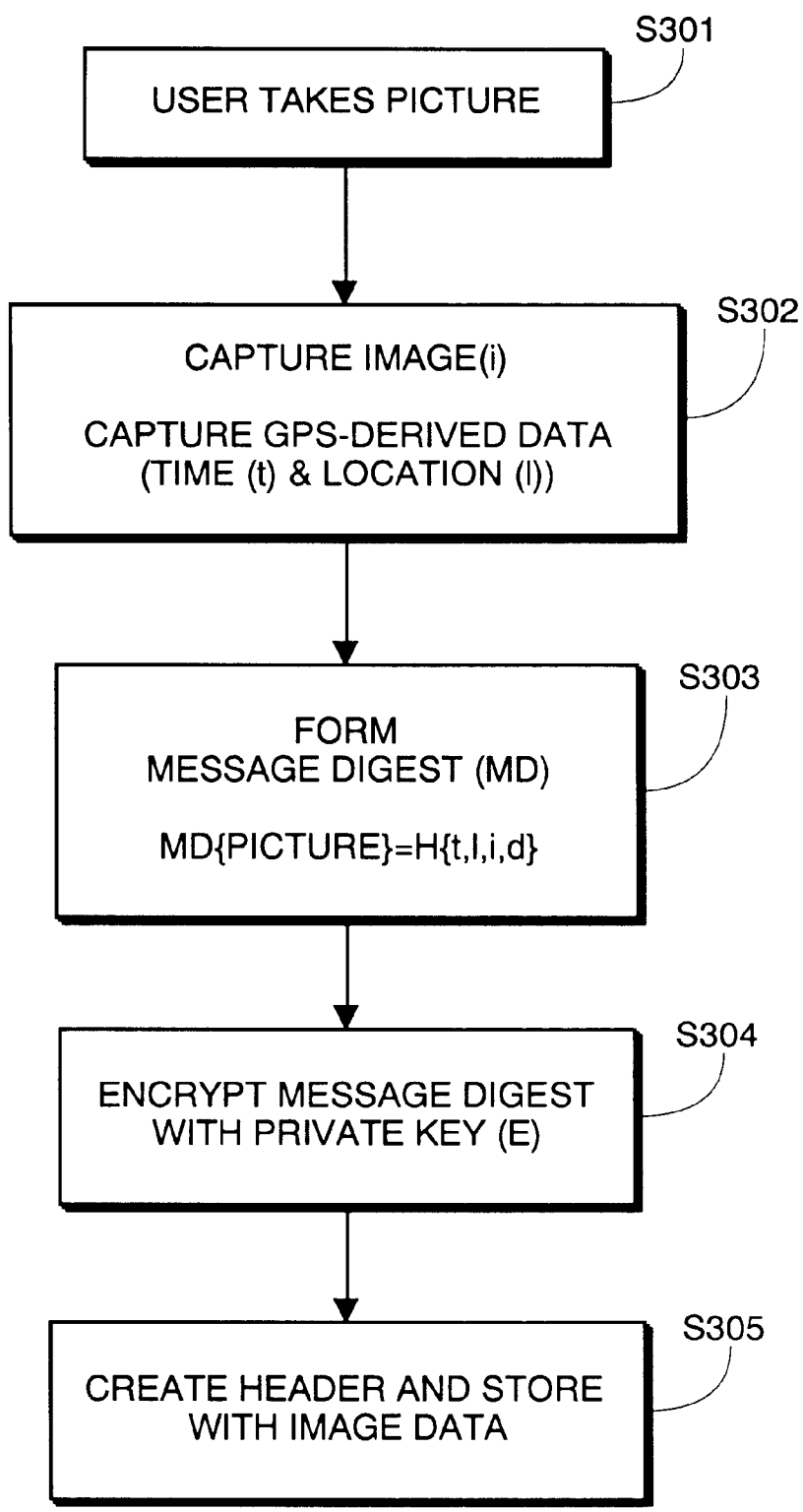
FIG. 3 in a flow diagram for explaining how a digital signature is derived for image data.

FIG. 3 is a flow diagram explaining process steps stored in a memory medium such as ROM 14, by which digital image data obtained by camera 10 is provided with a digital signature that can be used to authenticate the validity of the image data together with the validity of event time and location information stored with the image. Briefly, according to FIG. 3, based on image information and event information from the GPS-derived information captured by camera 10, a message digest is formed by a hashing function that utilizes both the image data and the GPS-derived data. The message digest is encrypted with a private key known only to camera 10, thereby forming a digital signature which can be used to validate the authenticity of the image data as well as the authenticity of the GPS-derived data. Thereafter, the digital image is stored in memory storage 16 together with a header that includes the encrypted message digest, as well as unencrypted GPS-derived data.

In more detail, upon a user's taking of a picture in step S301, digital camera lo captures image data from sensor 11, and further captures GPS-derived data including time and location data from GPS unit 30 over secure link 40 (in step S302). Step S303 calculates a message digest for the image data and for the GPS-derived data. The message digest is calculated using a hashing function which, through prearrangement, is the same hashing function that is used to validate the authenticity of the image. The purpose of the hashing function is to derive a short digest of the image information and the GPS-derived data, with the property that even if a single bit of such information is changed, a different digest would result In this embodiment of the invention, a message digest MD for the image is derived from a hashing function H as follows:

$$MD\{picture\}=H\{t+1+i+d\}$$

where t is time information and 1 is location information, both derived from the GPS, i is the digital image data itself, and d is camera information such as serial number, size and exposure information.

Thereafter, in step S304, digital camera 10 encrypts the message digest with a private key E. Specifically, camera 10 has associated with it a unique private key not known outside of camera 10. One possibility is to store the private key B in ROM 14, although other and more tamper-free arrangements may be provided. The private key has a complementary public key which operates such that only the public key can decrypt information encrypted by the private key, and vice-versa (i.e., only the private key can decrypt information encrypted by the public key).

In step S305, digital camera 10 stores the image data in storage section 16, with the image data being stored in a file together with header information that includes the encrypted message digest, as well as unencrypted information that went into the message digest. In this embodiment of the invention, since time and location data from the GPS-derived data, as well as camera information are all included in the message digest, the header includes the time and location information as well as the camera information.

Figure 4:
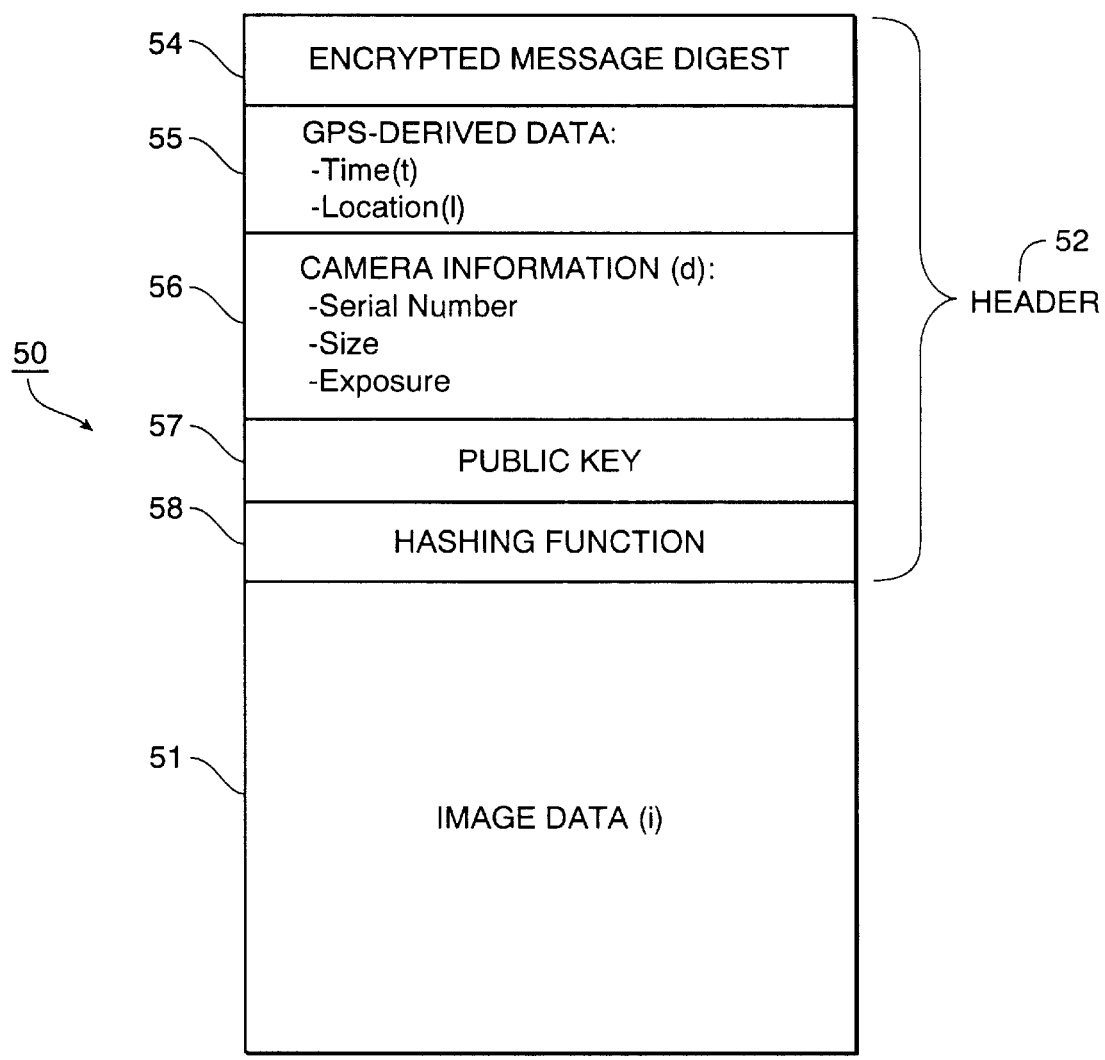
FIG. 4 is a view for explaining the format of an image file including a header that contains an authenticated digital signature.

FIG. 4 illustrates one preferable format for the image file. As shown in FIG. 4, image file 50 includes digital image data i at section 51, and further includes header information 52. The header information includes the encrypted message digest 54, the GPS-derived data 55 including time data (t) and location data (l) and camera information 56 (d) including camera serial number, size and exposure information. As a convenience, header 52 may als include a public key 57 and the identity of the hashing function 58; however, these are more preferably obtained from a more trusted source, such as a centralized source of public information, so as to prevent forgeries simply through use of incorrect public keys or hashing functions. Thus, providing public key 57 and the identify 58 of the hashing function within the header is a matter of convenience only.

Figure 5:
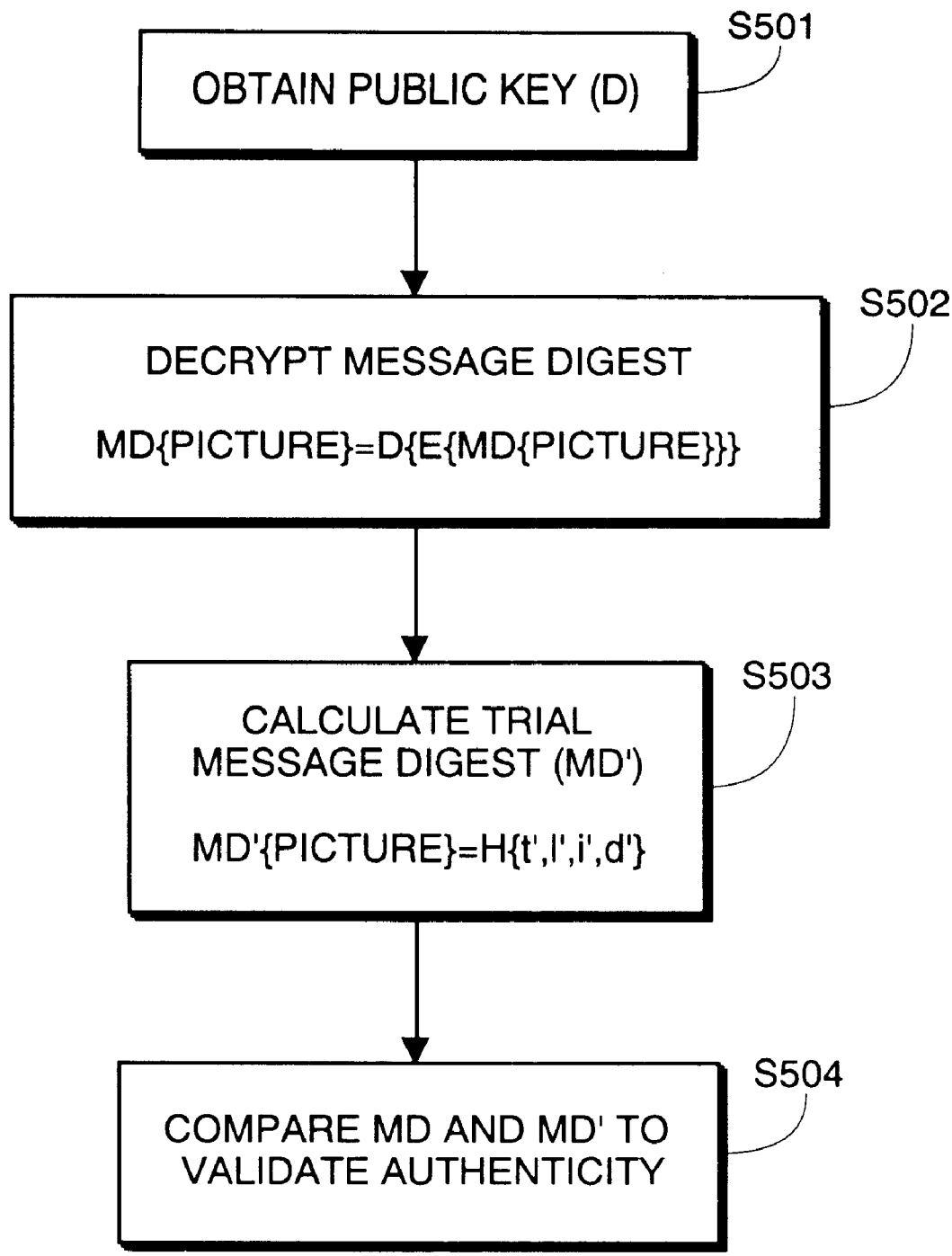
FIG. 5 is a flow diagram for explaining how to verify the authenticity of image data.

FIG. 5 is a flow diagram illustrating process steps on a memory medium such as ROM 14 or on disk in a personal computer (PC), by which the authenticity of image data and event data (time and location data) are verified. The process steps shown in FIG. 5 may be carried out in camera 10, but more preferably they are carried out in another device such as a personal computer that has access to file so (such as through transfer of such files from storage section 16) and desires to confirm the authenticity of the file.

Briefly, according to FIG. 5, to validate the authenticity of a digital image that contains a digital signature for image data and for GPS-derived event data, a public key is obtained such as from a trusted party, and is used to decrypt the digital signature so as to obtain a decrypted message digest. Then, a trial message digest is calculated using a previously agreed-upon hashing function, and based on the image data in the image file and the unencrypted time and location data in a header for the image file The trial message digest is compared against the decrypted message digest, and if the two message digests agree then the image data is validated as authentic; conversely, if the two message digests do not agree, then the image data cannot be trusted.

In more detail, step S501 obtains the public key D that complements the private key E used by digital camera 10. The public key is preferably obtained from a trusted source such as publicly available information that publishes public keys in correspondence to serial numbers of cameras. Alternatively, the public key D can be obtained from header 52 of the image file, although this source is less trustworthy since it can be forged.

Step S502 uses the public key D to decrypt the encrypted message digest 54. The decrypted message digest MD thus represents a decryption of the digital signature:

$$MD\{picture\}=D\{E\{KD\{picture\}\}\}$$

Step S503 calculates a trial message digest MD'. The trial message digest is calculated with the same hashing as was used by digital camera 10, either through pre-arrangement or by obtaining the identity of the hashing function from field 58 of header 52. The trial message digest is calculated using the same information used by digital camera 10 to create the original message digest, and uses the unencrypted information stored in header 52. Thus, in this embodiment of the invention, the trial message digest is based on the unencrypted codes for GPS-derived time and location information, as well as the image information itself and camera information such as serial number, size and exposure:

$$MD'\{picture\}=H\{t'+l'+i'+d'\}$$

where primes (e.g., "t" are used to denote corresponding information obtained from the file header.

Step S504 compares the trial message digest MD' to the decrypted message digest MD. If the two message digests are the same, then the authenticity of both the image data and the GPS-derived data is validated. Conversely, if the two message digests do not agree, the image data cannot be trusted.

While the invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method for forming a digital signature for authentication of image data for a digital camera that has captured event data for the image data, comprising the steps of:

creating a message digest for the image data, the message digest being derived from the image data and from the event data;

encrypting the message digest with a private key unique to and secured with the digital camera; and creating an image file for the image data, the image file having a header that includes the private-key-encrypted message digest together with unencrypted event data.

2. A method according to claim 1, wherein the event data comprises GPS-derived data.

3. A method according to claim 1, wherein the event data includes time stamp data and location data.

4. A method according to claim 3, wherein said step of creating the message digest includes creating the message digest with digital camera information data.

5. A method according to claim 3, wherein said header includes unencrypted camera information data.

6. A method according to claim 1, wherein said header includes a public key complementary to the private key and which can be used to decrypt the encrypted message digest.

7. A method according to claim 1, wherein said step of creating a message digest includes the step of using a hashing function which through pre-arrangement can be used to validate authenticity based on unencrypted data in the header.

8. A method according to claim 7, wherein said header includes an identifier for the hashing function.

9. An apparatus for forming a digital signature for authentication of image data for a digital camera that has captured event data for the image data, said apparatus comprising:

a first creation means for creating a message digest for the image data, the message digest being derived from the image data and from the event data;

means for encrypting the message digest with a private key unique to and secured with the digital camera; and a second creation means for creating an image file for the image data, the image file having a header that includes the private-key-encrypted message digest together with unencrypted event data.

10. An apparatus according to claim 9, wherein the event data comprises GPS-derived data.

11. An apparatus according to claim 9, wherein the event data includes time stamp data and location data.

12. An apparatus according to claim 11, wherein said first creation means includes means for creating the message digest with digital camera information data.

13. An apparatus according to claim 11, wherein said header includes unencrypted camera information data.

14. An apparatus according to claim 9, wherein said header includes a public key complementary to the private key and which can be used to decrypt the encrypted message digest.

15. An apparatus according to claim 9, wherein said first creation means includes a hashing function which through pre-arrangement can be used to validate authenticity based on unencrypted data in the header.

16. An apparatus according to claim 15, wherein said header includes an identifier for the hashing function.

17. An apparatus for forming a digital signature for authentication of image data for a digital camera that has captured event data for the image data, comprising:

a program memory for storing process steps of: (1) creating a message digest for the image data, the message digest being derived from the image data and from the event data, (2) encrypting the message digest with a private key unique to and secured with the digital camera, and (3) creating an image file for the image data, the image file having a header that includes the private-key-encrypted message digest together with unencrypted event data; and a processor for executing the process steps stored in said memory.

18. An apparatus according to claim 17, wherein the event data comprises GPS-derived data.

19. An apparatus according to claim 17, wherein the event data includes time stamp data and location data.

20. An apparatus according to claim 19, wherein said step of creating the message digest includes creating the message digest with digital camera information data.

21. An apparatus according to claim 19, wherein said header includes unencrypted camera information data.

22. An apparatus according to claim 17, wherein said header includes a public key complementary to the private key and which can be used to decrypt the encrypted message digest.

23. An apparatus according to claim 17, wherein said step of creating a message digest includes the step of using a hashing function which through pre-arrangement can be used to validate authenticity based on unencrypted data in the header.

24. An apparatus according to claim 23, wherein said header includes an identifier for the hashing function.

25. Computer-executable process steps stored on a computer readable medium, said computer-executable process steps for forming a digital signature for authentication of image data for a digital camera that has captured event data for the image data, said computer-executable process steps comprising:

a first creating step to create a message digest for the image data, the message digest being derived from the image data and from the event data;

an encrypting step to encrypt the message digest with a private key unique to and secured with the digital camera; and a second creating step to create an image file for the image data, the image file having a header that includes the private-key-encrypted message digest together with unencrypted event data.

26. Computer-executable process steps according to claim 25, wherein the event data comprises GPS-derived data.

27. Computer-executable process steps according to claim 25, wherein the event data includes time stamp data and location data.

28. Computer-executable process steps according to claim 27, wherein said first creating step to create a message digest includes a creating step to create the message digest with digital camera information data.

29. Computer-executable process steps according to claim 27, wherein said header includes unencrypted camera information data.

30. Computer-executable process steps according to claim 25, wherein said header includes a public key complementary to the private key and which can be used to decrypt the encrypted message digest.

31. Computer-executable process steps according to claim 25, wherein said first step of creating to create a message digest includes a using step to use a hashing function which through pre-arrangement can be used to validate authenticity based on unencrypted data in the header.

32. Computer-executable process steps according to claim 31, wherein said header includes an identifier for the hashing function.

33. A method for validating authenticity of an image file containing image data and a header that includes a private-key-encrypted message digest together with unencrypted data including event data that went into forming the message digest, said method comprising the steps of:

obtaining a public key complementary to a private key used to encrypt the message digest;

decrypting the private-key-encrypted message digest using the public key so as to obtain a message digest;

calculating a trial message digest using a hashing function the same as the hashing function used to form the private-key-encrypted message digest, and also using the unencrypted event data in the header; and comparing the trial message digest to the decrypted message digest to determine the authenticity of the image file, wherein the event data includes location data.

34. A method according to claim 33, wherein the location data comprises GPS-derived data.

35. A method according to claim 33, wherein said step of obtaining the public key comprises the step of obtaining the public key from a trusted party.

36. A method according to claim 33, wherein said step of obtaining the public key comprises the step of obtaining the public key from the header.

37. A method according to claim 33, wherein said header includes camera information, and wherein said step of calculating a trial message digest comprises a step of calculating the trial message digest using the camera information.

38. A method according to claim 37, further comprising the step of obtaining an identity of the hashing function from the header.

39. An apparatus for validating authenticity of an image file containing image data and a header that includes a private-key-encrypted message digest together with unencrypted data including event data that went into forming the message digest, said apparatus comprising:

means for obtaining a public key complementary to a private key used to encrypt the message digest;

means for decrypting the private-key-encrypted message digest using the public key so as to obtain a message digest;

means for calculating a trial message digest using a hashing function the same as the hashing function used to form the private-key-encrypted message digest, and also using the unencrypted event data in the header; and means for comparing the trial message digest to the decrypted message digest to determine the authenticity of the image file, wherein the event data includes location data.

40. An apparatus according to claim 39, wherein the location data comprises GPS-derived data.

41. An apparatus according to claim 39, wherein the means for obtaining the public key comprises means for obtaining the public key from a trusted party.

42. An apparatus according to claim 39, wherein the means for obtaining the public key comprises means for obtaining the public key from the header.

43. An apparatus according to claim 39, wherein said header includes camera information, and wherein said means for calculating a trial message digest comprises means for calculating the trial message digest using the camera information.

44. An apparatus according to claim 43, further comprising means for obtaining an identity of the hashing function from the header.

45. An apparatus for validating authenticity of an image file containing image data and a header that includes a private-key-encrypted message digest together with unencrypted data including event data that went into forming the message digest, comprising:

a program memory for storing process steps executable to: (1) obtain a public key complementary to a private key used to encrypt the message digest, (2) decrypt the private-key-encrypted message digest using the public key so as to obtain a message digest, (3) calculate a trial message digest using a hashing function the same as the hashing function used to form the private-key-encrypted message digest, and also using the unencrypted event data in the header, and (4) compare the trial message digest to the decrypted message digest to determine the authenticity of the image file, wherein the event data includes location data; and a processor for executing the process steps stored in said memory.

46. An apparatus according to claim 45, wherein the location data comprises GPS-derived data.

47. An apparatus according to claim 45, wherein said step of obtaining the public key comprises the step of obtaining the public key from a trusted party.

48. An apparatus according to claim 45, wherein said step of obtaining the public key comprises the step of obtaining the public key from the header.

49. An apparatus according to claim 45, wherein said header includes camera information, and wherein said step of calculating a trial message digest comprises a step of calculating the trial message digest using the camera information.

50. A method according to claim 49, further comprising the step of obtaining an identity of the hashing function from the header.

51. Computer-executable process steps stored on a computer readable medium, said computer-executable process steps for validating authenticity of an image file containing image data and a header that includes a private-key-encrypted message digest together with unencrypted data including event data that went into forming the message digest, said computer-executable process steps comprising:

an obtaining step to obtain a public key complementary to a private key used to encrypt the message digest;

a decrypting step to decrypt the private-key-encrypted message digest using the public key so as to obtain a message digest;

a calculating step to calculate a trial message digest using a hashing function the same as the hashing function used to form the private-key-encrypted message digest, and also using the unencrypted event data in the header; and a comparing step to compare the trial message digest to the decrypted message digest to determine the authenticity of the image file, wherein the event data includes location data.

52. Computer-executable process steps according to claim 51, wherein the location data comprises GPS-derived data.

53. Computer-executable process steps according to claim 51, wherein said step of obtaining the public key comprises the step of obtaining the public key from a trusted party.

54. Computer-executable process steps according to claim 51, wherein said step of obtaining the public key comprises the step of obtaining the public key from the header.

55. Computer-executable process steps according to claim 51, wherein said header includes camera information, and wherein said step of calculating a trial message digest comprises a step of calculating the trial message digest using the camera information.

56. Computer-executable process steps according to claim 55, further comprising the step of obtaining an identity of the hashing function from the header.

57. A secure connection between a GPS receiver and a digital camera, whereby the digital camera can obtain secure GPS-derived data in correspondence to digital images obtained by the digital camera, comprising:

a private key encrypter in the GPS receiver, said private key encrypter for private-key-encryption of information corresponding to GPS-derived data;

a public key decrypter in the digital camera, said public key decrypter for public-key-decryption of the private-key-encrypted GPS-derived data; and an interface between the GPS receiver and the digital camera for transmitting the private-key-encrypted GPS-derived data from the GPS receiver to the digital camera.

58. A secure connection between a GPS receiver and a digital camera according to claim 57, wherein said private key encrypter private-key-encrypts a message digest corresponding to the GPS-derived data.

59. A secure connection between a GPS receiver and a digital camera, according to claim 58, wherein the private key is secure with the GPS receiver, and wherein the public key is obtained from a trusted source and is complementary to the private key.

* * * * *

UNITED STATES PATENT AND TRADEMARK OFFICE
CERTIFICATE OF CORRECTION

PATENT NO.   : 6,269,446 B1
DATED        : July 31, 2001
INVENTOR(S)  : Thomas Schumacher et al.

It is certified that error appears in the above-identified patent and that said Letters Patent is hereby corrected as shown below:

Column 1,
Line 53, "Friedmin's" should read -- Friedman's --.

Column 3,
Line 5, "in" should read -- is --.

Column 4,
Line 27, "lo" should read -- 10 --.
Line 38, "result In" should read -- result. In --.

Column 5,
Line 6, "als" should read -- also --.
Line 20, "so" should read -- 50 --.

Signed and Sealed this

Twenty-sixth Day of March, 2002

Attest:

JAMES E. ROGAN
*Attesting Officer*   *Director of the United States Patent and Trademark Office*